(12) United States Patent
Lenrow (10) Patent No.: US 11,349,910 B2
(45) Date of Patent: May 31, 2022

(54) PINHOLE ACCESS FOR ELEVATED CONTAINERIZED PROCESS CAPABILITY

(71) Applicant: Verizon Patent and Licensing Inc., Basking Ridge, NJ (US)

(72) Inventor: David Robert Lenrow, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/991,843

(22) Filed: Aug. 12, 2020

(65) Prior Publication Data
US 2022/0053047 A1 Feb. 17, 2022

(51) Int. Cl.
| | |
|---|---|
| H04L 67/10 | (2022.01) |
| H04L 67/133 | (2022.01) |
| H04L 9/40 | (2022.01) |
| G06F 9/54 | (2006.01) |
| H04L 69/16 | (2022.01) |

(52) U.S. Cl.
CPC .......... *H04L 67/10* (2013.01); *G06F 9/547* (2013.01); *H04L 63/105* (2013.01); *H04L 67/40* (2013.01); *H04L 69/162* (2013.01)

(58) Field of Classification Search
CPC ....... G06F 9/547; H04L 63/10; H04L 63/101; H04L 63/105; H04L 67/10; H04L 67/40; H04L 69/162
See application file for complete search history.

(56) References Cited

U.S. PATENT DOCUMENTS

| | | | | |
|---|---|---|---|---|
| 2015/0199531 A1* | 7/2015 | Ismael | .................... | G06F 21/53 726/30 |
| 2016/0381032 A1* | 12/2016 | Hashmi | .................... | G06F 9/468 726/4 |
| 2017/0052807 A1* | 2/2017 | Kristiansson | ............. | G06F 8/60 |
| 2019/0340091 A1* | 11/2019 | Chandrasekaran | ......................... | G06F 11/2094 |
| 2020/0076685 A1* | 3/2020 | Vaidya | ................ | H04L 61/3015 |
| 2021/0133000 A1* | 5/2021 | Okman | ................... | H04L 67/34 |

OTHER PUBLICATIONS

Data dog, "DogStatsD over Unix Domain Socket" (available at https://docs.datadoghq.com/developers/dogstatsd/unix_socket, visited Jul. 16, 2020).

* cited by examiner

*Primary Examiner* — Jeong S Park (57) ABSTRACT

A system described herein may provide a technique for providing extended container capabilities via helper functions that are executed by an entity with a higher privilege level than that of the containerized process. In order to limit the opportunity for malicious or otherwise unauthorized use of such extended container capabilities, such helper functions may limit enabled arguments and/or otherwise limit utilization of functionality associated with a higher privilege level.

20 Claims, 8 Drawing Sheets

PINHOLE ACCESS FOR ELEVATED CONTAINERIZED PROCESS CAPABILITY

BACKGROUND

Various network functions or virtual network functions may be implemented using containerized processes. Different levels of privileges may be provided to users, containers, or other components to provide access to pre-defined sets of functions.

DETAILED DESCRIPTION OF THE PREFERRED EMBODIMENTS

The following detailed description refers to the accompanying drawings. The same reference numbers in different drawings may identify the same or similar elements.

Embodiments described herein provide for ways to provide extended capabilities to containerized processes. Generally, such containerized processes may be associated with a privilege level, category, discrete value, etc. At lower privilege levels, such as "Operator", various host functionality may not be made available to the containerized process. Many such processes may be associated with permission groups that provide access to extended functionality available at higher privilege levels, such as "NetAdmin" (or "CAP_NET_ADMIN") or "SysAdmin" (or "CAP_SYS_ADMIN"). These processes may not necessarily need access to some of the functionality, and in fact may cause harm beyond their required capabilities if given blanket access to the privileges of these higher level groups.

As provided herein, a host of some embodiments may provide extended container capabilities via helper functions that are executed by an entity with a higher privilege level than the containerized process. In order to limit the opportunity for malicious or otherwise unauthorized use of such extended container capabilities, such helper functions may limit utilization of functionality associated with a higher privilege level, such as by limiting arguments that may be passed with a function call.

Helper functions may be received from various appropriate entities, such as application developers, that wish to utilize extended capabilities for containerized processes. Such helper functions may be analyzed to determine whether risk assessment criteria are met. If the risk assessment criteria are met, the received helper functions may be integrated into a host OS such that the extended capabilities of the helper function are made available through the host OS.

Figure 1:
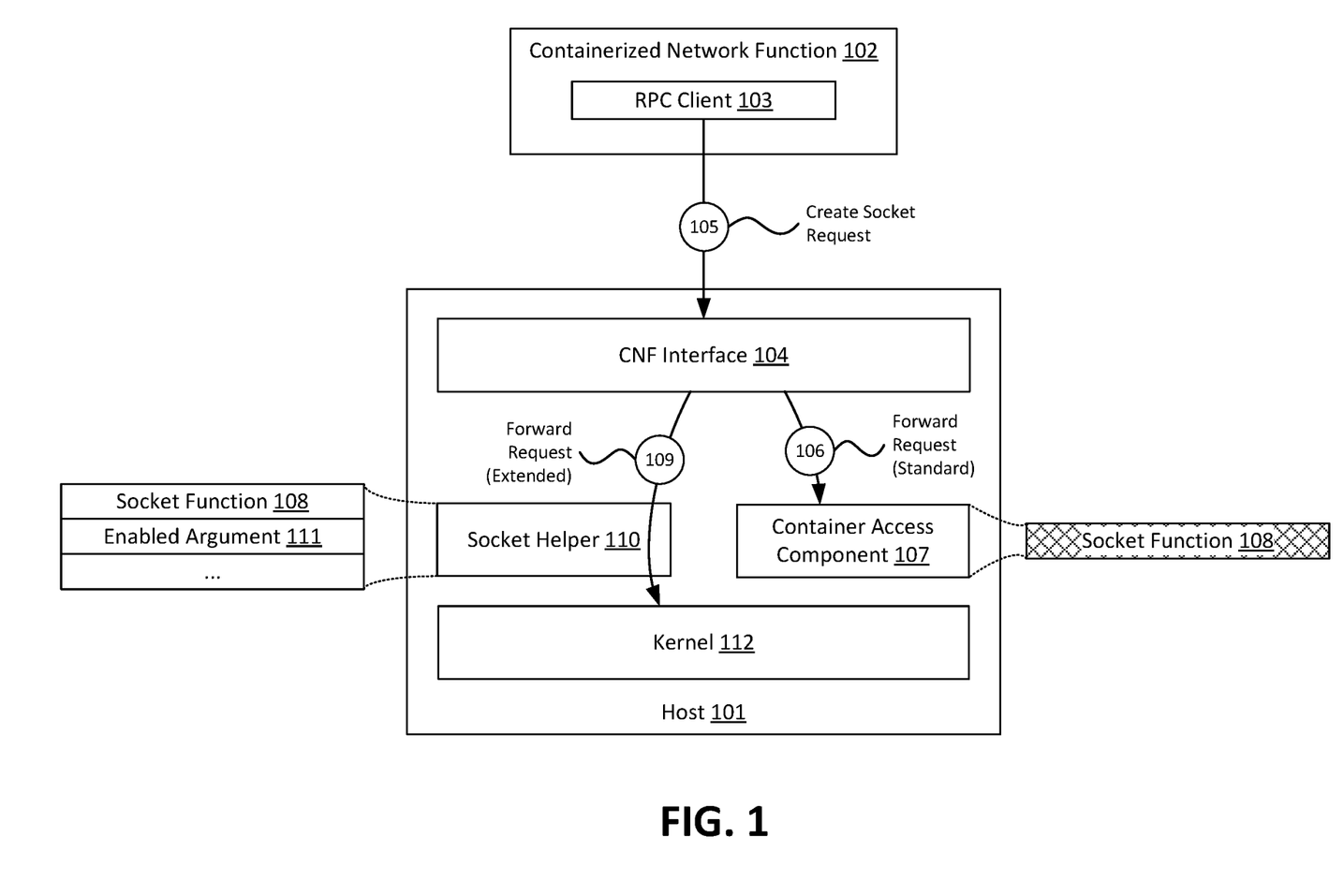
FIG. 1 illustrates an example overview of one or more embodiments described herein, in which a helper function provides extended capabilities to a containerized process.

As shown in FIG. 1, for example, host 101 may interact with a containerized network function ("CNF") 102. In this example, CNF 102 may implement a Virtualized Network Function ("VNF") of a wireless network, such as a virtual Distributed Unit ("vDU") and/or some other function of the wireless network. CNF 102 may interact with various other CNFs via host 101. In accordance with some embodiments, CNF 102 may include a remote procedure call ("RPC") client 103 that interacts with host 101 to execute command at host 101 in order to provide functionality associated with CNF 102.

Host 101 may include a CNF interface 104, such as an application programming interface ("API") or other type of suitable communication pathway. CNF interface 104 may include, or provide, a private point-to-point link between CNF 102 and host 101.

As shown, CNF 102, via RPC client 103, may send (at 105) a create socket request to host 101, via CNF interface 104. A "socket" may serve as a data communications endpoint for exchanging data between processes running on the same host.

Host 101 may include container access component 107 which may provide privilege-based access to functionality associated with host 101. CNF 102 may be associated with a specific category or level of access privilege. Such categories may include, for instance, "NetAdmin", "SysAdmin", "Operator", and/or other appropriate categories. For example, a NetAdmin capable container may be able to access all network configuration across all host and container processes running on host 101, a SysAdmin capable container may be able to access all configuration and functionality associated with host 101, and an Operator container may be able to access only a subset of that functionality. Various other categories of privilege or access may be associated with host 101 and/or containerized process 102.

In this example, CNF 102 may be associated with "Operator" or other low-level privileges. CNF interface 104 may forward (at 106) the create socket request message 105 using a standard or nominal capabilities channel associated with container access component 107. Container access component 107 may not provide the capability to use socket function 108 to CNF 102 having low-level privileges, as indicated by the cross-hatch pattern. In other words, the create socket request sent (at 105) would be ignored or otherwise not implemented by host 101, based on the privilege level of CNF 102. In some cases, an error message or other indication that the request exceeded the capabilities of CNF 102 may be provided.

CNF interface 104 may forward (at 109) create socket request 105 using extended capabilities provided by host 101 in some embodiments. The request may be forwarded (at 109) to socket helper 110. Host 101 may receive socket helper 110 from the same entity that provides or executes CNF 102. Socket helper 110 and CNF 102 may be provided as a pair of tightly coupled elements. Socket helper 110 may be received by host 101 via a process such as a process 500 described below.

Socket helper 110 may include access to socket function 108 and various enabled arguments 111 of socket function 108. Functions such as socket helper 110 and socket function 108 may be associated with various "actions". For instance, socket function 108 may perform the action of generating or providing a socket.

Enabled arguments 111 may include a subset of available arguments for the associated function (e.g., socket function 108). For example, socket function 108 may include arguments such as, for instance, type, protocol, and domain while socket helper 110 may provide only a subset of available arguments (e.g., domain) as enabled arguments 111 for use by CNF 102. In some cases, no arguments may be enabled, such that a helper function (e.g., socket helper 110) may be called by CNF 102 but all arguments may be automatically generated at the helper function, may be based on default values, and/or otherwise may be specified without regard to any data provided by CNF 102 other than the function call itself. A "helper" function, such as socket helper 110, may include, or provide access to, multiple functions (e.g., socket function 108) associated with a higher privilege level than a privilege level with which a given CNF (e.g., CNF 102) is associated.

Socket helper 110 may be implemented in various appropriate ways. For instance, in some embodiments, socket helper 110 may include, or be implemented by, one or more CNFs having a privilege level that allows access to the functionality associated with socket helper 110. As another example, socket helper 110 may be included as a sub-element of container access component 107 or other appropriate resource of host 101 that has access to resources needed to provide the functionality associated with socket helper 110.

In order to prevent malicious use of socket helper 110, access to, or use of socket function 108 may be limited in various appropriate ways. For instance, a socket function implemented by kernel 112 may have various associated attributes or arguments. Such arguments may include, for instance, type, protocol, and domain. Socket helper 110 may provide only a subset of available arguments as enabled arguments 111 for use by CNF 102.

In some cases, no arguments may be enabled and attributes or parameters associated with socket function 108 may not be otherwise configurable via the create socket request 105. Socket helper 110 may receive the forwarded request 109 and may automatically generate any arguments. For example, each CNF associated with a given host (e.g., CNF 102 and host 101) may be associated with a private UNIX domain socket ("UDS"), such as CNF interface 104, between the CNF and host. A name of a socket may be derived from a particular base (e.g., /tmp/helper/sockets/child$N), where $N may be a unique container identifier or label that is discoverable by the container and host at runtime. While "$N" is used here as an example, in practice, other types of identifiers or labels may be used to uniquely identify a container. Thus, in this example, having no enabled attributes, a hijacker or other malicious user could only use socket helper 110 to create a single socket with the pre-defined or automatically generated attributes and would not otherwise be able to exploit extended capabilities associated with the privilege level of socket helper 110. In other words, socket helper 110 may not receive or allow any arguments to be passed to the associated socket function 108 such that no other sockets than the default socket may be created and any attempt to pass attributes or otherwise control the operation of socket function 108 would be ignored or otherwise not implemented.

As shown, socket helper 110 may forward (at 109) create socket request 105, via socket function 108 and any associated arguments, to kernel 112 for implementation or execution. In this example, a socket may be created and the resulting socket descriptor returned to CNF 102.

Figure 2:
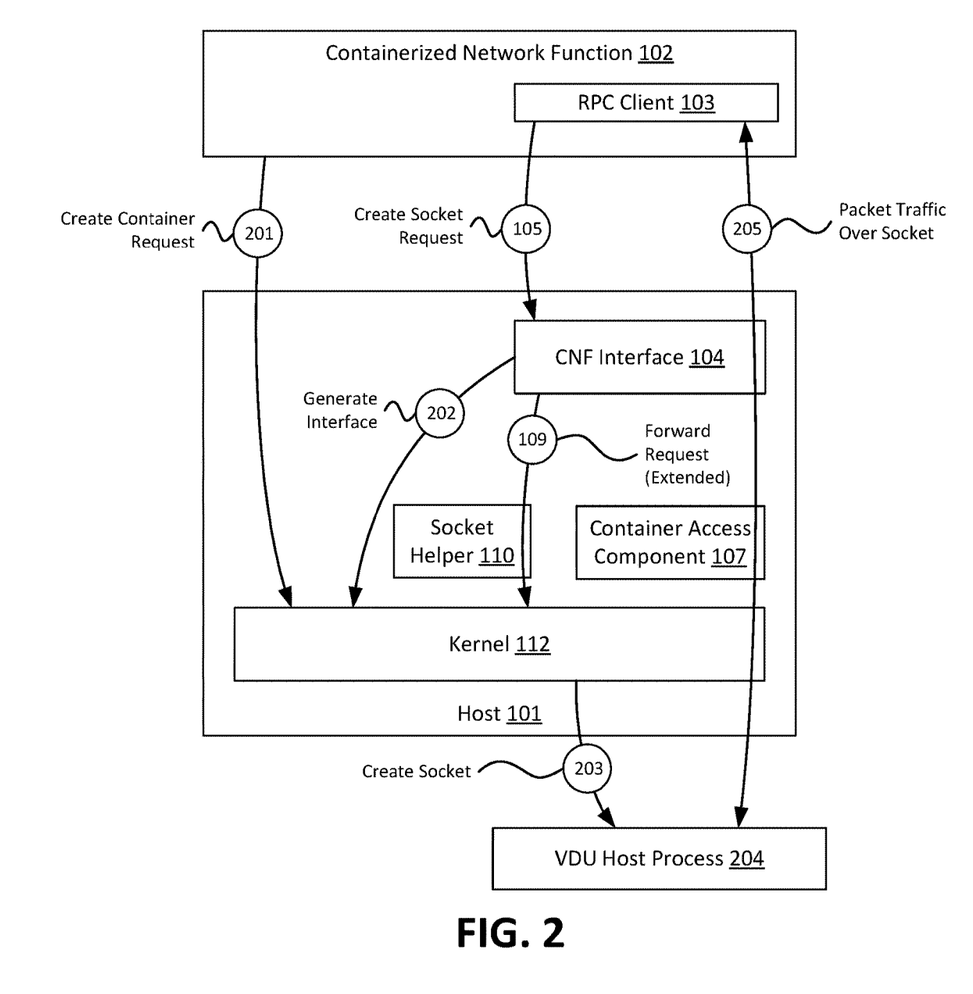
FIG. 2 illustrates an example overview of one or more embodiments described herein, in which a container process is initiated and a socket to another process is generated.

FIG. 2 illustrates, for example, creation of a containerized process and use of associated functionality, in order to provide a limited set of functionality that is a subset of a pre-defined permission level. In this example, CNF 102 may send (at 201) a create container request. The request may be implemented in various appropriate ways, in accordance with some embodiments. For instance, one or more messages may be exchanged between CNF 102 and host 101, an application associated with CNF 102 may launch a child process, and/or other appropriate ways.

In this example, create container request 201 may be processed by kernel 112 and a generate interface command or message 202 may cause host 101 to generate or otherwise make available CNF interface 104, which may be specifically associated with CNF 102 (or a containerized process thereof). Thus, CNF interface 104 may only be accessible to CNF 102 in this example because of the parent-child relationship between host 101 and CNF 102. Specifically, CNF interface 104 may include, or be implemented by, a UDS such that unauthenticated RPCs may, without risk of identity abuse, be used by CNF 102 to request helper functionality, if available.

RPC client 103 may send (at 105) a create socket request, which may be forwarded (at 109) to kernel 112 via socket helper 110 as described above. Kernel 112 may implement the request and create (at 203) a socket between CNF 102 and VDU host process 204. After the socket has been created using socket helper 110, packet traffic may be sent (at 205) over the socket using standard or non-extended container access component 107.

Figure 3:
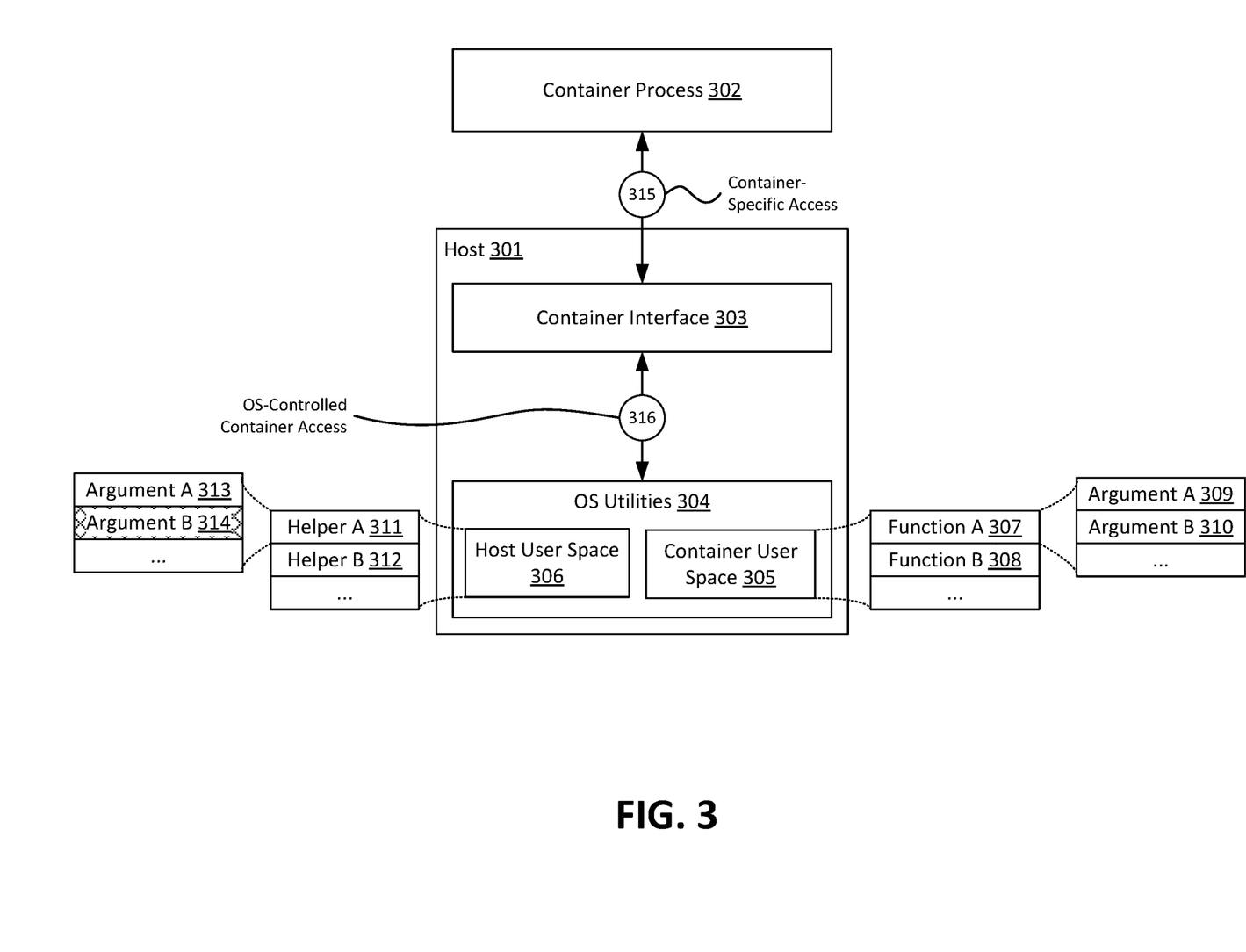
FIG. 3 illustrates an example overview of one or more embodiments described herein, in which extended capabilities are provided to a containerized process through helper functions included in a host operating system ("OS")

FIG. 3 illustrates, for example, host 301, which provides extended capabilities to any number of container processes 302. Each container process 302 may be associated with a container user space 305 and a host user space 306, where the container user space 305 and host user space 306 may provide capabilities associated with different privilege levels.

Host 301 may provide extended capabilities to a container process 302, such as CNF 102. Host 301 may include a container interface 303, such as a UDS, associated with each container process 302. Host 301 may include OS utilities 304, which may have total access to, and control over, all resources and/or functions of host 301, including kernel capabilities. OS utilities 304 may include or otherwise provide various container user space capabilities 305 and various host user space capabilities 306.

Container user space, or "nominal", capabilities 305 may include various functions, such as example functions 307 and 308, and associated arguments, such as example arguments 309 and 310, available to container process 302 based on a privilege level or category associated with container process 302 (and associated container user space 305). Host user space capabilities 306 may include various helper functions (and/or other functions) available to container process 302 based on a privilege level or category associated with host user space 306.

For instance, container process 302, and associated container user space 305, may provide or include functionality associated with an "Operator" privilege level and may be prevented from calling or executing a particular function, such as create socket, even if such a function call is received via container user space 305. Host user space 306 may provide access to functionality associated with "SysAdmin" or other elevated privilege level, where a create socket function call (or other extended capability function call) will be executed if received via host user space 306. Such access control may be administered by a host OS utility 304 such as kernel 112.

For instance, host user space 306 may include example helper functions 311 and 312, each with associated arguments, such as example arguments 313 and 314, which may or may not be enabled to container process 302. In this example, argument A 313 may be enabled, while argument B 314 may not be enabled. Arguments may be enabled or disabled via container interface 303 in some embodiments. For instance, container interface 303 may include a container-specific API that is associated with container process 302. Arguments exposed via container interface 303 may include a sub-set of available arguments. In addition, arguments received via container interface 303 may be transformed or otherwise manipulated before being passed to OS utilities 304. For example, a name argument for a socket may be exposed via container interface 303. Any received value may be truncated and appended to a pre-defined value or string such that only a portion of the name is able to be specified by container process 302.

For example, if helper A 311 is a socket helper such as socker helper 110, helper A 311 may be associated with argument A 313, such as a domain argument, that is enabled, and argument B 314, such as a type argument, that is not enabled. Continuing the example, helper A 311 may allow container process 302 to specify, in a create socket request utilizing helper A 311, a communication domain via enabled argument A 313 but not a type of socket via disabled or non-enabled argument B 314, where the type may be automatically generated, set to a default value, and/or otherwise determined or provided.

RPCs may be received from container process 302 via container-specific access 315, which may include, or be implemented by, a UDS or other appropriate interface. RPCs may be received at host 301 via container interface 303. OS utilities 304 may provide OS-controlled container access 316 such that RPCs are routed to an appropriate resource from nominal capabilities 305 or extended capabilities 306. OS utilities 304 may include standard kernel APIs (or "system calls") and/or non-kernel based OS utilities. Such routing may be transparent to container process 302, such that all RPCs are sent to host 301 without regard for whether an individual RPC will be executed by nominal or standard function 307 and/or 308, or helper function 311 and/or 312. Helper functions 311 and 312 may be included in or added to extended capabilities 306 using a process such as 500 described below.

Figure 4:
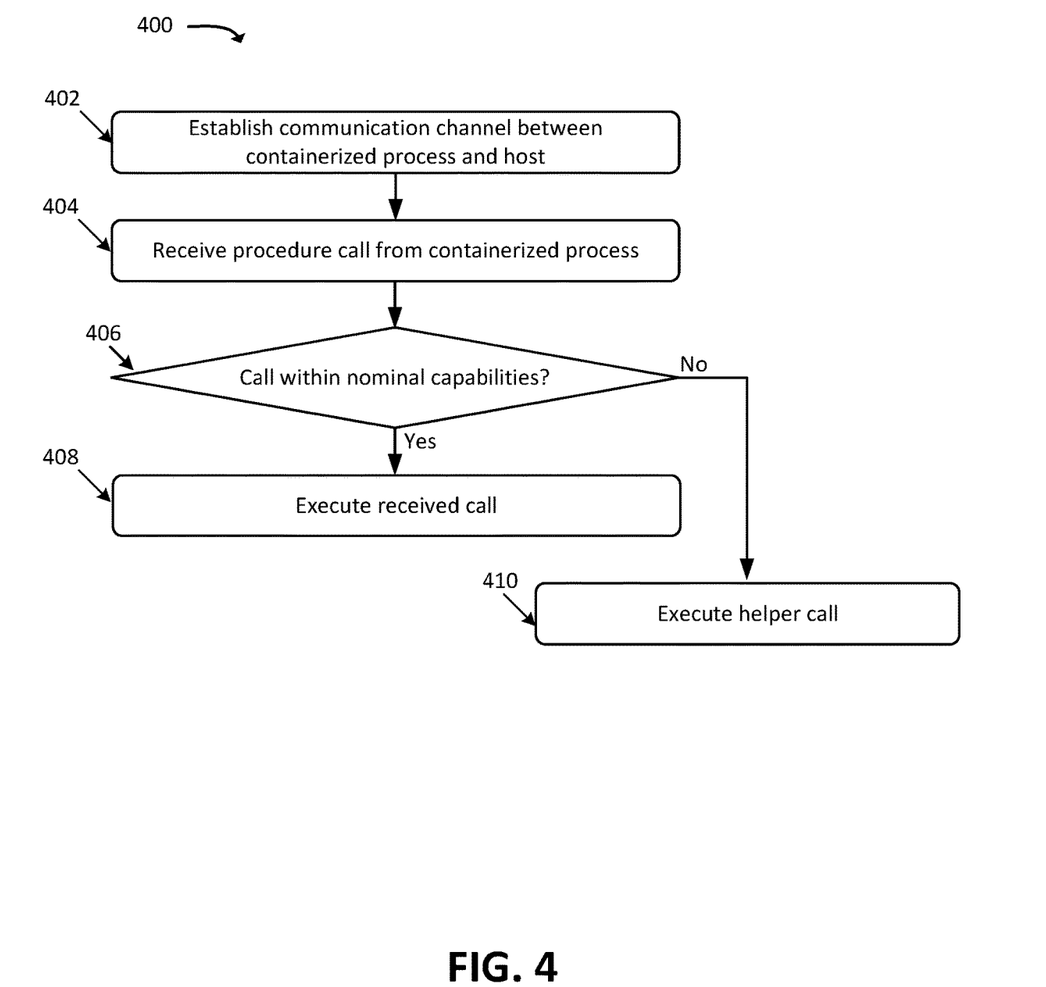
FIG. 4 illustrates an example process for providing extended capabilities to a containerized process, in accordance with some embodiments.

FIG. 4 illustrates an example process 400 for providing extended capabilities to a containerized process. In some embodiments, some or all of process 400 may be performed by host 102. In some embodiments, one or more other devices may perform some or all of process 400 (e.g., in concert with, and/or in lieu of, host 101).

As shown, process 400 may include establishing (at 402) a communication channel between a containerized process and host. Such a channel may include, or be implemented by, a UDS as described above. The host may include a host OS which provides various nominal capabilities associated with a container privilege level or category.

Process 400 may further include receiving (at 404) a procedure call from the containerized process. Such an RPC may be received via the communication channel.

Process 400 may additionally include determining (at 406) whether the received call is within the nominal capabilities associated with the container privilege level.

Process 400 may also include executing (at 408) the received call if the process determines (at 406) that the received call is within the nominal capabilities associated with the container privilege level. As described above, RPCs associated with nominal capabilities of a container privilege level may be executed normally, without use of any helper functions.

Process 400 may further include executing (at 410) a helper call if the process determines (at 406) that the received call is not within the nominal capabilities associated with the container privilege level. Such a helper call may utilize one or more helper functions as described above. Such helper functions may be executed at a higher privilege level than the container privilege level.

Figure 5:
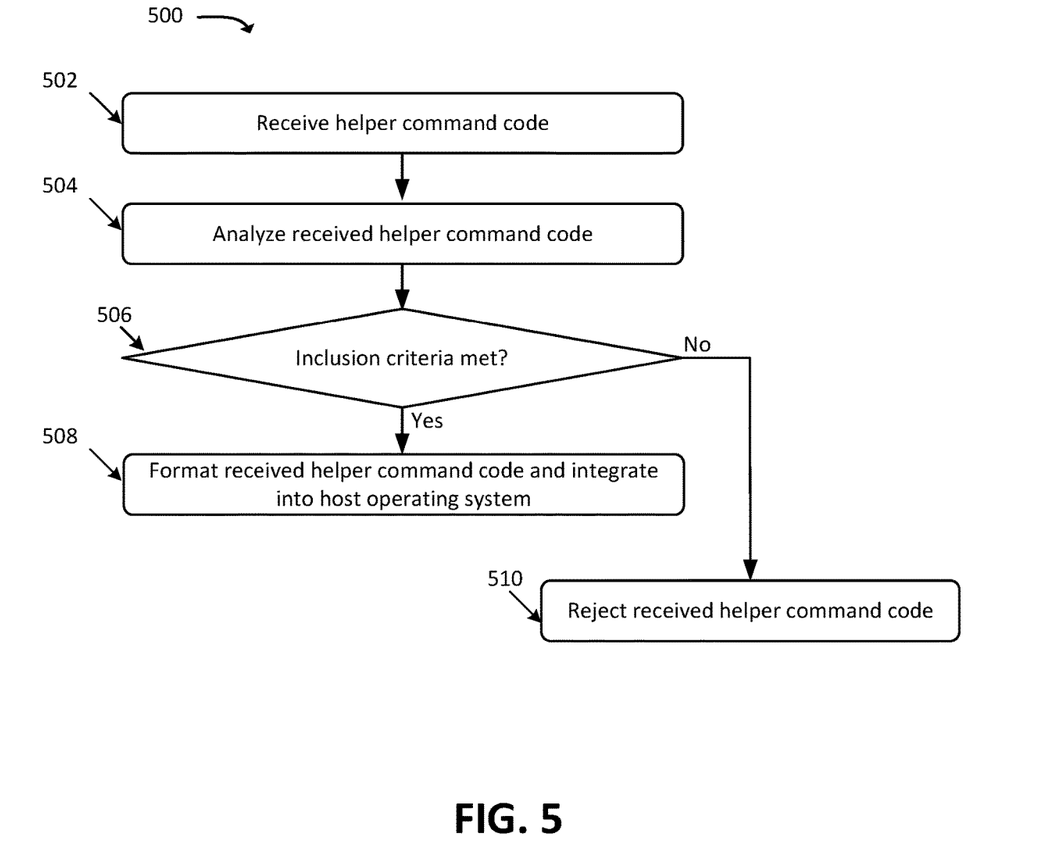
FIG. 5 illustrates an example process for adding a helper function to a host OS, in accordance with some embodiments.

FIG. 5 illustrates an example process 500 for adding a helper function to a host OS, in accordance with some embodiments. In some embodiments, some or all of process 500 may be performed by host 102. In some embodiments, one or more other devices may perform some or all of process 500 (e.g., in concert with, and/or in lieu of, host 101).

As shown, process 500 may include receiving (at 502) helper command code. Such code may be received via various appropriate submission channels. For instance, code may be submitted to an approval resource associated with host 101. Such helper command code may include references to functions and/or attributes associated with extended privileges or capabilities for one or more privilege categories.

Process 500 may further include analyzing (at 504) the received helper command code. Such analysis may include, for instance, identification of extended privilege function calls, identification of enabled arguments, determination of other limitations, if any. Analysis may include testing of received code under various operating conditions or usage scenarios.

Process 500 may additionally include determining (at 506) whether inclusion criteria has been met. Such criteria may include, for instance, lists of arguments that may not be enabled for each available function. The criteria may include, as another example, passing values, scores, or other measures for various required test suites.

Process 500 may also include formatting (at 508) the received helper command code and integrating the code into the host operating system if the process determines (at 506) that the inclusion criteria has been met. The updated host operating system may be distributed to the various associated hosts.

Process 500 may further include rejecting (at 510) the received helper command code if the process determines (at 506) that the inclusion criteria has not been met. The submitter of the helper command code may receive a rejection message or otherwise be notified that the submitted code was not accepted. In some cases, such a rejection message may indicate various relevant criteria, test data, and/or other relevant information associated with the rejection.

Figure 6:
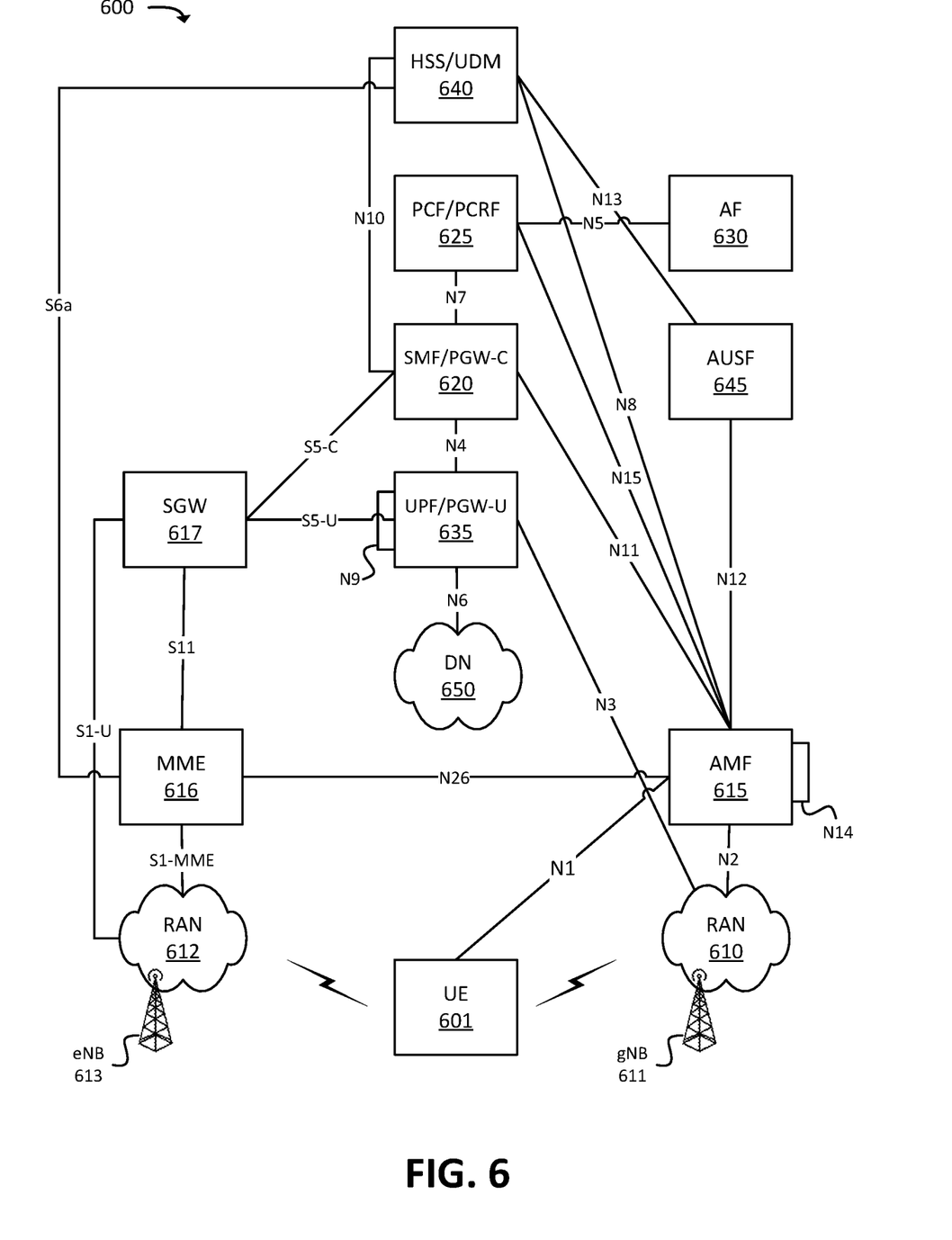
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 601 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 615 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

Figure 7:
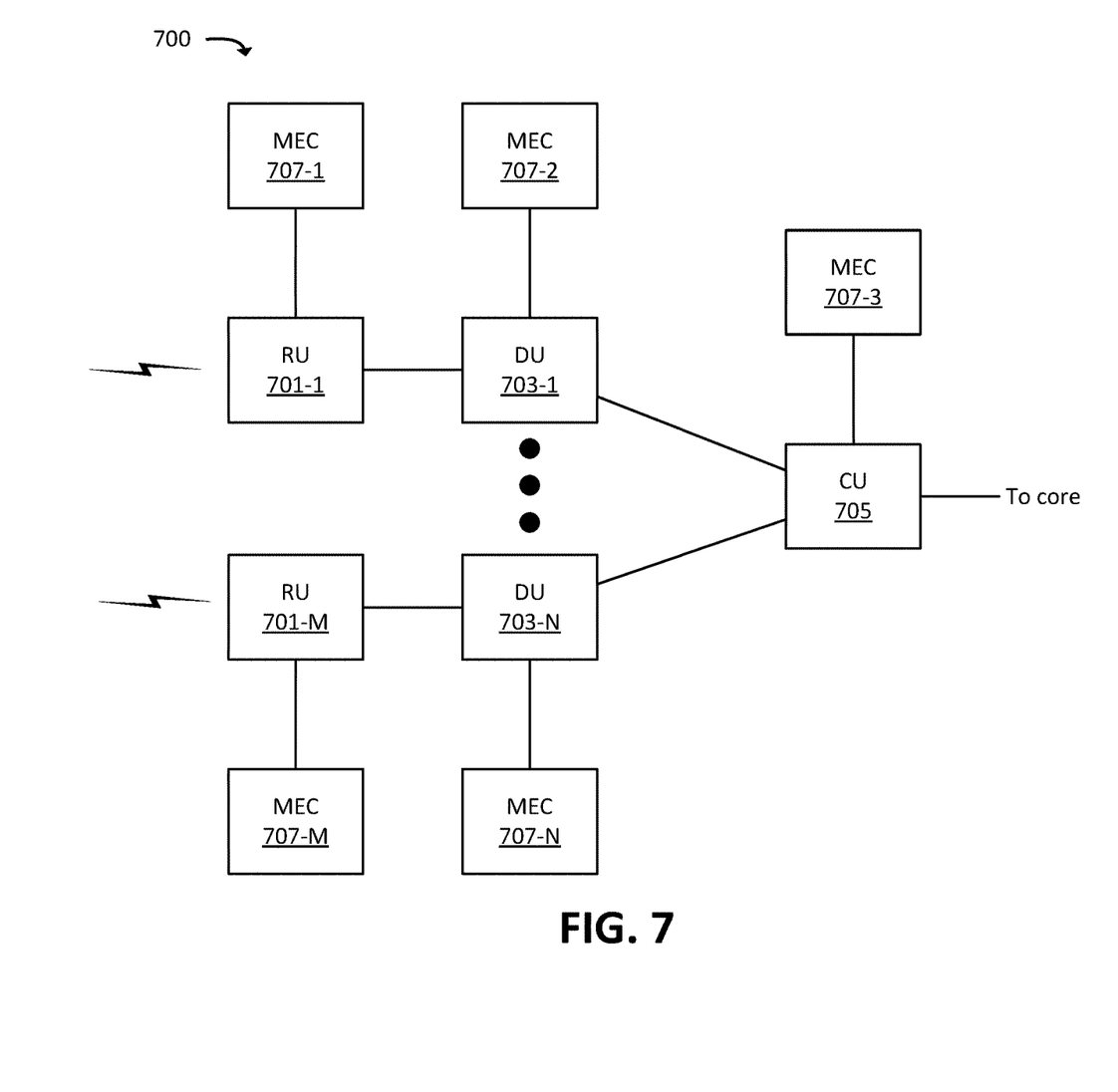
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Remote Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more Multi-Access/Mobile Edge Computing ("MEC") devices, referred to sometimes herein simply as ("MECs") 707. For example, RU 701-1 may be communicatively coupled to MEC 707-1, RU 701-M may be communicatively coupled to MEC 707-M, DU 703-1 may be communicatively coupled to MEC 707-2, DU 1103-N may be communicatively coupled to MEC 707-N, CU 1105 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network.

Host 101 and/or CNF 102 may be, may include, and/or may be implemented by one or more MECs 707. In some embodiments, Host 101 and/or CNF 102 may be, may include, and/or may be implemented by one or more of the other devices or systems described above with respect to FIGS. 6 and/or 7 (e.g., DU 703, CU 705, AMF 615, SMF/PGW-C 620, etc.).

Figure 8:
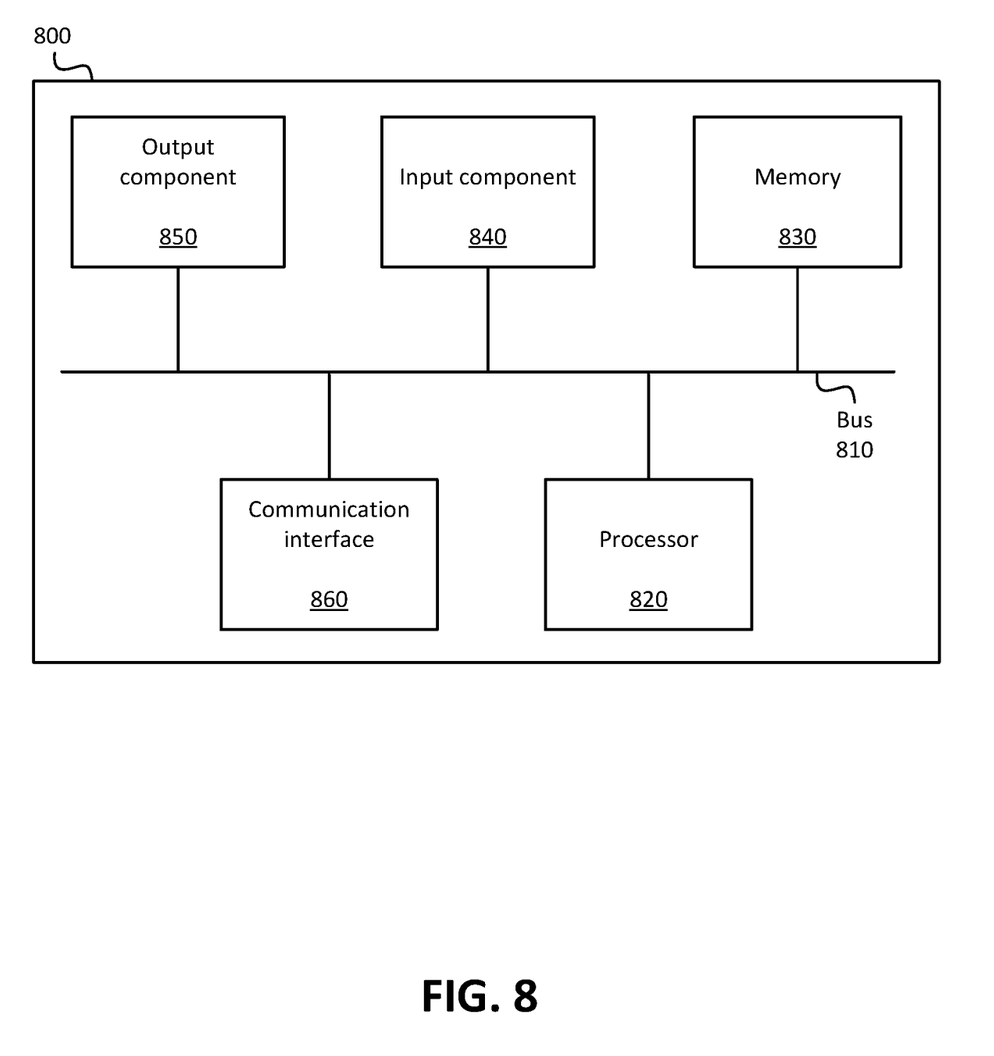
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
establish a private communication channel between a host and a containerized process;
determine a first privilege level of the containerized process, the first privilege level including a first set of actions associated with the host that the containerized process is authorized to request;
receive, by the host, a request from the containerized process over the private communication channel to perform a particular action, wherein the request includes a first set of arguments;
determine that the first set of actions associated with the containerized process does not include the requested particular action;

provide, based on determining that the first set of actions does not include the requested particular action and further based on the request being received over the private communication channel, a helper command at the host, the helper command being associated with a second privilege level including a second set of actions, the second set of actions including the particular action; and execute, by the helper command, the requested particular action with a second set of arguments that includes one or more default values and is different from the first set of arguments, wherein executing the requested particular action with the second set of arguments includes replacing the first set of arguments with the one or more default values.

2. The device of claim 1, wherein the one or more processors are further configured to:
receive, by the host, a request from the containerized process over the private communication channel to perform a second particular action;
determine that the first set of actions associated with the containerized process includes the requested second particular action; and
execute the requested second particular action.

3. The device of claim 1, wherein the private communication channel comprises a private domain socket, wherein containerized processes associated with the private communication channel are executed at the host.

4. The device of claim 1, wherein the host is associated with a plurality of discrete privilege categories including the first privilege level and the second privilege level.

5. The device of claim 1, wherein the containerized process is a child process of a host process running on the host.

6. The device of claim 1, wherein the containerized process is a particular containerized process of a plurality of containerized processes, wherein the private communication channel is inaccessible to the other containerized processes of the plurality of containerized processes.

7. The device of claim 1, wherein the one or more default values include a default socket endpoint value.

8. A non-transitory computer-readable medium, storing a plurality of processor-executable instructions to:
establish a private communication channel between a host and a containerized process;
determine a first privilege level of the containerized process, the first privilege level including a first set of actions associated with the host that the containerized process is authorized to request;
receive, by the host, a request from the containerized process over the private communication channel to perform a particular action, wherein the request includes a first set of arguments;
determine that the first set of actions associated with the containerized process does not include the requested particular action;
provide, based on determining that the first set of actions does not include the requested particular action and further based on the request being received over the private communication channel, a helper command at the host, the helper command being associated with a second privilege level including a second set of actions, the second set of actions including the particular action; and
execute, by the helper command, the requested particular action with a second set of arguments that includes one or more default values and is different from the first set of arguments, wherein executing the requested particular action with the second set of arguments includes replacing the first set of arguments with the one or more default values.

9. The non-transitory computer-readable medium of claim 8, wherein the plurality of processor-executable instructions are further to:
receive, by the host, a request from the containerized process over the private communication channel to perform a second particular action;
determine that the first set of actions associated with the containerized process includes the requested second particular action; and
execute the requested second particular action.

10. The non-transitory computer-readable medium of claim 8, wherein the private communication channel comprises a private domain socket where containerized processes associated with the private communication channel are executed at the host.

11. The non-transitory computer-readable medium of claim 8, wherein the host is associated with a plurality of discrete privilege categories including the first privilege level and the second privilege level.

12. The non-transitory computer-readable medium of claim 8, wherein the containerized process is a child process of a host process running on the host.

13. The non-transitory computer-readable medium of claim 8, wherein the containerized process is a particular containerized process of a plurality of containerized processes, wherein the private communication channel is inaccessible to the other containerized processes of the plurality of containerized processes.

14. The non-transitory computer-readable medium of claim 8, wherein the one or more default values include a default socket endpoint value.

15. A method, comprising:
establishing a private communication channel between a host and a containerized process;
determining a first privilege level of the containerized process, the first privilege level including a first set of actions associated with the host that the containerized process is authorized to request;
receiving, by the host, a request from the containerized process over the private communication channel to perform a particular action, wherein the request includes a first set of arguments;
determining that the first set of actions associated with the containerized process does not include the requested particular action;
provide, based on determining that the first set of actions does not include the requested particular action and further based on the request being received over the private communication channel, a helper command at the host, the helper command being associated with a second privilege level including a second set of actions, the second set of actions including the particular action; and
executing, by the helper command, the requested particular action with a second set of arguments that includes one or more default values and is different from the first set of arguments, wherein executing the requested particular action with the second set of arguments includes replacing the first set of arguments with the one or more default values.

16. The method of claim 15 further comprising:
receiving, by the host, a request from the containerized process over the private communication channel to perform a second particular action;
determining that the first set of actions associated with the containerized process includes the requested second particular action; and
executing the requested second particular action.

17. The method of claim 15, wherein the private communication channel comprises a private domain socket where containerized processes associated with the private communication channel are executed at the host and the containerized process is a child process of a host process running on the host.

18. The method of claim 15, wherein the host is associated with a plurality of discrete privilege categories including the first privilege level and the second privilege level.

19. The method of claim 15, wherein the containerized process is a particular containerized process of a plurality of containerized processes, wherein the private communication channel is inaccessible to the other containerized processes of the plurality of containerized processes.

20. The method of claim 15, wherein the one or more default values include a default socket endpoint value.

* * * * *